(12) United States Patent  
Pfeffer et al.

(10) Patent No.: US 9,014,359 B1  
(45) Date of Patent: Apr. 21, 2015

(54) GENERATION OF PHONE NUMBER LISTS AND CALL FILTERING

(71) Applicants: Howard Leigh Pfeffer, Reston, VA (US); Matthew John Cannon, Reston, VA (US); Jeffrey James Lindsay, Great Falls, VA (US)

(72) Inventors: Howard Leigh Pfeffer, Reston, VA (US); Matthew John Cannon, Reston, VA (US); Jeffrey James Lindsay, Great Falls, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 141 days.

(21) Appl. No.: 13/739,162

(22) Filed: Jan. 11, 2013

(51) Int. Cl.
*H04M 3/42* (2006.01)
*H04M 3/436* (2006.01)

(52) U.S. Cl.
CPC ..................................... *H04M 3/436* (2013.01)

(58) Field of Classification Search
USPC ............... 379/88.19, 210.02, 211.02, 207.02, 379/221.08, 88.24
See application file for complete search history.

(56) References Cited

U.S. PATENT DOCUMENTS

| | | | |
|---|---|---|---|
| 6,697,461 B1 * | 2/2004 | Middleswarth et al. | ... 379/88.24 |
| 6,990,187 B2 * | 1/2006 | MacNamara et al. | ... 379/210.02 |
| 7,020,259 B2 * | 3/2006 | Hussain et al. | .......... 379/211.02 |
| 8,374,328 B2 * | 2/2013 | Saha et al. | ............... 379/210.02 |
| 8,379,816 B1 * | 2/2013 | Lu et al. | ................... 379/142.01 |
| 8,406,396 B2 * | 3/2013 | Prasad et al. | ............. 379/142.05 |
| 8,406,398 B2 * | 3/2013 | Gore | ......................... 379/142.15 |
| 8,548,133 B1 * | 10/2013 | Koster | ........................ 379/93.03 |
| 2007/0160186 A1 * | 7/2007 | Wang | ....................... 379/207.15 |
| 2010/0119048 A1 * | 5/2010 | Kobayashi et al. | ...... 379/112.01 |
| 2011/0129078 A1 * | 6/2011 | Takeyama et al. | ....... 379/201.02 |
| 2014/0128047 A1 * | 5/2014 | Edwards et al. | .............. 455/415 |

* cited by examiner

*Primary Examiner* — Joseph J Nguyen
(74) *Attorney, Agent, or Firm* — Chapin IP Law, LLC

(57) ABSTRACT

An analyzer resource receives call information about outbound phone calls from multiple phone numbers to target phone numbers in a phone network. The analyzer resource analyzes the call information to detect likely unwanted call activity. Based on the analyzing, the analyzer resource produces a list of phone numbers from which one or more entities originate unwanted calls to the subscribers in the phone network.

36 Claims, 9 Drawing Sheets

CALL HANDLER SETTINGS
150

| SUBSCRIBER NAME | TARGET PHONE NUMBER | FILTER CALLS IN LIST? | CALL HANDLER SETTINGS |
|---|---|---|---|
| JOHN DOE | (617)453-0702 | ☑ | CALLER ID TEXT NOTIFICATION |
| JOSEPH SMITH | (212)334-4592 | ☐ | N/A |
| DAVID JOHNSTON | (607)754-1648 | ☑ | BLOCK CALL, NO NOTIFICATION |
| ... | | ... | ... |

FIG. 3

GENERATION OF PHONE NUMBER LISTS AND CALL FILTERING

BACKGROUND

It is well known that conventional phone systems assign a phone number to each phone device in a phone network. To place a call to a target phone device, one dials the phone number assigned to the target phone device. The phone service provider receives the call request and initiates a call alert in the phone network to the target phone device.

During the call alert, the target phone typically rings to indicate occurrence of an incoming call. If the target phone device goes unanswered, the calling party may end the attempt to reach the target phone device or the caller alert period may time out. If the user of the target phone device accepts the incoming call (i.e., answers the phone), a two-way communication link is established between the calling party and target phone device.

Most phone numbers are publicly available to telemarketers unless the subscriber requests the phone number to be unlisted. Telemarketers typically make calls to publicly available phone numbers to sell products and/or services. In most instances, telemarketer calls are annoying to recipients. Unfortunately, if a phone number is registered as unlisted, friends of the subscriber cannot easily obtain the phone number of the subscriber. Thus, there is a tradeoff between making a phone number publicly available (potentially inviting telemarketing calls) and registering the phone number as being unlisted (preventing legitimate persons from obtaining a phone number).

Because receiving calls from telemarketers is so annoying, attempts have been made to reduce the amount of unwanted telemarketer calls to phone subscribers. For example, the government has set up a so-called Do Not Call (DNC) list. One can register their phone number on the Do Not Call list to provide notification that a subscriber assigned the phone number does not wish to receiving telemarketing calls to the registered phone number. In theory, the telemarketers should not make calls to the phone numbers on the Do Not Call list. However, in reality, the telemarketers often call without regard to the wishes of the receiving parties not to receive unsolicited phone calls. This is particularly disturbing because the DNC list does not serve the intended purposes of reducing or eliminating telemarketing calls.

BRIEF DESCRIPTION OF EMBODIMENTS

As discussed above, conventional phone use suffers from a number of deficiencies. For example, even though one may register a respective phone number on a Do Not Call list, certain undesirable telemarketers typically continue to still call the respective phone number. The inability to control who is able to call your own phone device or phone number diminishes the value of being assigned use a landline phone number, which is more vulnerable to receiving unwanted calls than cell phone numbers. To make matters worse, even if one is able to avoid answering unwanted incoming calls based on recognition of an unwanted incoming call via so-called caller ID information, the undesirable telemarketers typically leave voicemail messages if the call is not terminated by the called party. In such an instance, in addition to being needlessly distracted by the incoming call, the user must spend time deleting the unwanted voicemail messages in their voice mailbox.

Embodiments herein are useful over conventional techniques. For example, one embodiment herein is directed to producing a call filter list including phone numbers from which (suspected or verified) unwanted calls are made in a phone network. As discussed herein, the list can be used to prevent unwanted calls to subscribers. The unwanted calls can be made from any of one or more different types of entities such as a telemarketers, prank callers, etc.

More specifically, according to one embodiment, a call analyzer resource receives call information specifying attributes of outbound phone calls made from multiple phone numbers to target phone numbers in a phone network. For calls in a phone network, the call information can include any of one or more attributes: a phone number of a resource making the respective call, a target phone number to which the respective call is directed, a duration of the respective call, a start and/or end time of the call, whether the call is accepted by the target phone device, etc. The analyzer resource analyzes the call information to detect suspected unwanted call activity associated with phone devices that are assigned the multiple phone numbers. Based on the analyzing, the analyzer resource produces a list of phone numbers from which at least one entity originates unwanted or undesirable calls to the subscribers in the phone network.

The call information used to generate the list can be received from one or more different resources depending on the embodiment. For example, the call information (e.g., call heuristics information) can be received from call monitoring hardware disposed in the phone network. The call monitoring hardware can be configured to log durations, frequencies, etc., of calls made from multiple different phone numbers to the subscribers in the phone network. A high frequency of multiple short duration calls (e.g., many relatively short calls from the phone in a short amount of time) from a particular phone number can indicate that the phone number is used for telemarketing activity.

One way to determine whether to place a phone number in the list can include producing a respective persistence metric for a corresponding phone number used in the phone network. The value assigned to the persistence metric can vary based on a degree to which the corresponding phone number is persistently used to contact one or more subscribers in the phone network. By way of a non-limiting example, the value assigned to the persistence metric can be increased if the analyzer resource detects many relatively short calls from the phone in a short amount of time. If the value assigned to the persistence metric increases above a threshold value (e.g., more than 100 short duration phone calls are made within an hour of time), the analyzer resource can be configured to classify the corresponding phone number as being used for telemarketing activity. In other words, the analyzer resource includes the phone number in the list if a phone device assigned the phone number illustrates a high degree of persistence making outbound phone calls to one or more subscribers.

In alternative embodiments, generation of the telemarketer call filter list can be reputation-based. By way of a non-limiting example, the analyzer resource can be configured to receive the call information as feedback from the subscribers in the phone network. For example, received call information can include feedback from multiple subscribers in a phone network. The feedback from the subscribers can specify phone numbers from which the multiple subscribers receive unwanted calls such as telemarketing calls. In other words, via caller ID, the subscribers can identify which phone numbers are being used by telemarketers to perform telemarketing activities. The analyzer resource can be configured to analyze the feedback from one or more parties to detect suspected telemarketing activity associated with the phone numbers.

Based on the analysis of the feedback, the analyzer resource produces a list to include the phone numbers from which the telemarketing calls are made to the multiple subscribers.

In one embodiment, the analyzer resource produces a respective reputation metric for each of multiple possible telemarketer phone numbers to keep track of a degree to which a corresponding one of phone numbers is used to contact subscribers in the phone network. As its name suggests, the reputation metric can indicate whether the user associated with a respective phone number has a good or bad reputation.

By way of a non-limiting example, the reputation metric for a phone number initially can be set to a low value and can be incremented each time feedback from a different subscriber in the phone network confirms that that the phone number is used for telemarketing activity. Thus, the reputation metric can change over time as it becomes more and more likely that the phone number is used for telemarketing activities. In response to detecting that a reputation metric for a respective phone number substantially indicates that the corresponding phone number is used for telemarketing (e.g., because the reputation metric exceeds a threshold value), the analyzer resource includes the respective phone number in the list.

As discussed herein, the analyzer resource can detect that a particular phone number is potentially being used by a telemarketer resource to perform telemarketing activity in the phone network in any of multiple different ways. In accordance with further embodiments, the analyzer resource (or other suitable resource) in the phone network can be configured to proactively verify whether the particular phone number is used for telemarketing activity.

One way to verify the number is to initiate a call to the particular phone number and make an actual inquiry as to available services, goods, etc. Another way to verify that a telemarketer in the phone network is using the particular phone number for telemarketing is to perform a search for information about the particular phone number on-line. Subsequent to verification that the particular phone number is used for telemarketing activity based on due diligence, the analyzer resource adds the particular phone number to the list.

Producing the listing of telemarketer phone numbers is useful because it enables filtering of telemarketer phone calls.

In one embodiment, a service provider can receive call handling instructions from each of one or more subscribers in the phone network that subscribe to telemarketer call filtering. The call handling instructions indicate how to handle subsequently received incoming phone calls from phone numbers in the list.

Assume in this example that the service provider receives an incoming phone call directed to a phone number assigned to a phone device operated by a given subscriber that subscribes to call filtering. In response to identifying that the incoming phone call originates from a phone number present in the list, the service provider handles the incoming phone call in accordance with the call handling instructions provided by a respective subscriber to which the incoming call is intended.

The call handling instructions can vary from subscriber to subscriber. For example, a subscriber can indicate to block or terminate any incoming calls from phone numbers in the list. In such an instance, the subscriber is not even notified that the telemarketer happens to be calling.

In accordance with further embodiments, the same set of call handler settings can be used for each of multiple subscribers in a group.

Thus, embodiments herein can include implementing a call filter service of preventing incoming phone call alerts that originate from phone numbers in the list from being forwarded to subscribers in the phone network that subscribe to the call filter service.

Alternatively, a subscriber can provide call handler settings indicating to allow incoming calls from phone numbers on the list but request receipt of a notification such as a text message or a unique audio tone along with notification of the incoming call from the service provider so that the subscriber is able to discern whether an incoming call is from a telemarketer or not. If desired, because the user is notified of the incoming call or call alert, the user can answer the incoming call even though it is from a phone number on the list.

Thus, embodiments herein can include implementing a call handling service of providing a notification along with forwarding of a corresponding incoming phone call alert that originates from a phone number in the list. The unique notification (audible signal or text message) on the user's target phone device indicates that the incoming phone call alert is from a phone number on the list.

Other call handling options can include forwarding the incoming call directly to voicemail, playing a pre-recorded announcement to the calling party suspected of being a telemarketer, undesirable caller, etc.

In accordance with further embodiments, a business entity can earmark a set of phone numbers to monitor occurrence of telemarketer activity in the phone network. The business entity can publicly distribute the set of phone numbers through information distribution channels (e.g., via the Internet, etc.) to one or more telemarketers. The business entity can initiate monitoring calls to the earmarked set of phone numbers. In response to detecting calls to the earmarked set of phone numbers from the at least one telemarketer, the business entity can initiate inclusion of respective phone numbers of the one or more telemarketers in the call filter list.

Further embodiments herein can include creating a call filter list and storing such a list in a federated database. For example, a first business entity can produce a first list of phone numbers of suspected telemarketing callers in a first phone network. A second business entity can produce a second list of phone numbers of suspected telemarketing callers in a second phone network. Each of the first list and second list can be generated in any suitable manner as previously discussed. Embodiments herein can further include producing a combined list including at least the first list and the second list and storing the combined list in the federated database. Via shared access to the federated database, both the first business entity and the second business entity (or other parties) can access the combined list to filter one or more incoming calls to subscribers.

As discussed in further detail below, phone records can be used to detect calling patterns indicating phone numbers that are likely used for telemarketing purposes. For example, calling numbers that reach or exceed a certain call threshold per time interval for a given geographical area and/or set of rate centers can be placed on a call filter list. Embodiments herein can include allowing customers to receive enhanced calling information (e.g. embellished Caller id information, distinctive ring, UI notification, etc.) and/or applied call disposition (block, ring-no-answer, play announcement, send to voicemail, . . . etc) to these calling numbers. In certain instances, a repudiation process may be is available to enable owners of phone numbers on the call filter list to remove their phone number from the list.

These and more detailed embodiments are discussed below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, one or more memory chips, etc., or other non-transitory media such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to create a listing of telemarketer phone numbers. The instructions, when executed by at least one processor of a respective computer device, cause the processor or multiple processors of the system to: receive call information, the call information specifying attributes of outbound phone calls made from multiple phone numbers to target phone numbers in a phone network; analyze the call information to detect suspected telemarketing activity associated with phone devices that are assigned the multiple phone numbers; and based on the analysis, produce a list of phone numbers from which at least one telemarketer originates calls to the subscribers in the phone network.

Yet another embodiment herein includes a computer readable storage medium and/or system having instructions stored thereon to perform call filtering or call handling based on use a list of telemarketer phone numbers. The instructions, when executed by a processor of a respective computer device, cause the processor or multiple processors of the system to: receive notification of an incoming call alert, the incoming call alert generated from a phone number of a phone device in a phone network; perform a query to determine whether the phone number is included on a list of phone numbers suspected of being used by telemarketers to contact subscribers in the phone network; and receive a response to the query, the response indicating whether the phone number in the query is suspected of being used for telemarketing activity.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of adaptive bit rate encoded content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3 is an example diagram illustrating call handler settings according to embodiments herein.

DETAILED DESCRIPTION

According to one embodiment, an analyzer resource receives call information about outbound phone calls made from multiple phone numbers to target phone numbers in a phone network. The call information can be any suitable type of information such as reputation-based feedback information generated by phone users, phone call log information indicating attributes (e.g., length of call, start and end time, etc.) of calls made in the phone network, etc. The analyzer resource analyzes the call information to detect likely occurring telemarketing activity associated with calls made in the phone network. Based on the analysis, the analyzer resource produces a list of phone numbers from which one or more telemarketers originate calls to the subscribers in the phone network. A call management system can be configured to use the list to perform call filtering and/or reduce unwanted telemarketer calls to phone users.

Figure 1:
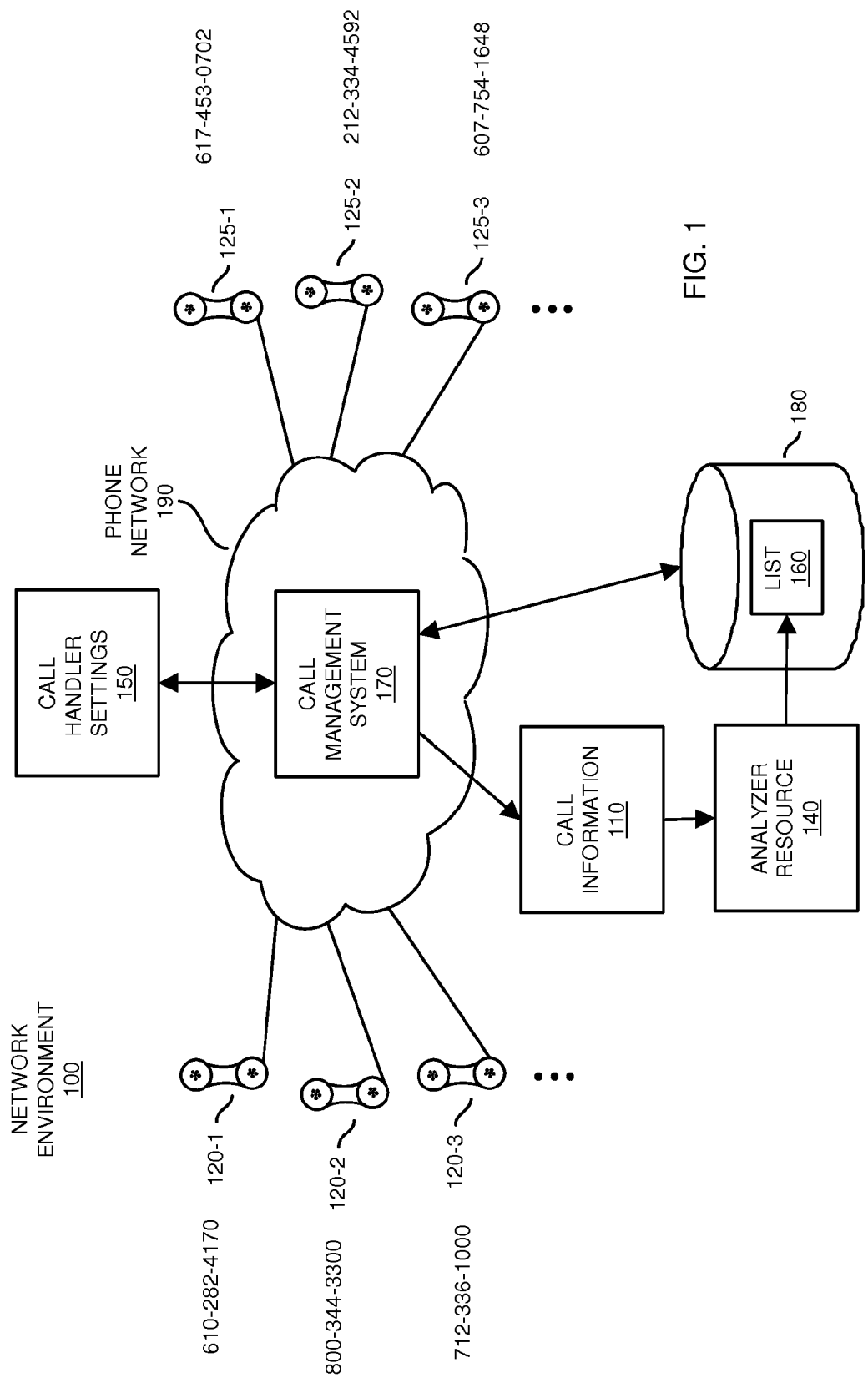
FIG. 1 is an example diagram illustrating a phone network environment and generation of a filter list according to embodiments herein.

FIG. 1 is an example diagram illustrating a phone network environment and generation of a call filter list according to embodiments herein.

As shown, network environment 100 can include a phone network 190, first set of communication devices 120 (e.g., communication device 120-1, communication device 120-2, communication device 120-3, . . . ), and second set of communication devices 125 (e.g., communication device 125-1, communication device 125-2, communication device 125-3, . . . ).

Each of communication devices 120 and 125 can be any suitable type of phone devices used to support bi-directional voice communications. Each device can be assigned a respective phone number, facilitating routing of calls to appropriate devices.

In one embodiment, communication devices 125 are phone devices operated by subscribers in a cable network environment. For example, a subscriber domain in the cable network environment can be assigned one or more phone numbers on which to receive incoming phone calls. A service provider of the cable network environment includes call handling resources, equipment, software, etc., to facilitate routing of incoming calls to appropriate subscribers in the cable network environment. Additionally, the service provider includes call handling resources, equipment, software, etc., to facilitate routing of outbound calls from the subscribers in the cable network environment to appropriate target phone devices. Communication devices 120 may or may not be subscribers in the cable network environment.

As previously mentioned, each of the communication devices in network environment 100 can be assigned a phone number. For example, as shown, communication device 120-1 is assigned phone number 610-282-4170; communication device 120-2 is assigned phone number 800-344-3300; communication device 120-3 is assigned phone number 712-336-1000; and so on. Communication device 125-1 is assigned phone number 617-453-0702; communication device 125-2 is assigned phone number 212-334-4592; communication device 125-3 is assigned phone number 607-754-1648; and so on.

In one embodiment, phone network 190 includes hardware and software resources facilitating phone connectivity amongst the communication devices. For example, a user (or machine) operating communication device 120-1 can dial the phone number (617-453-0702) assigned to communication device 125-1 in order to establish a call connection (e.g., supporting two-way voice communication) with a user operating communication device 125-1; a user (or machine) operating communication device 125-1 can dial a phone number (e.g., 800-344-3300) assigned to communication device 120-2 to establish a call connection with communication device 120-2; and so on.

Call management system 170 facilitates the connectivity of callers to called parties by receiving an incoming call alert from a phone device, providing notification of the call alert to a target phone device, and establishing a two-way communication link between the caller and called parties in response to the called party accepting the incoming call.

According to one embodiment, via call monitoring hardware and/or software, the call management system 170 keeps track of outbound calls from the phone numbers assigned to communication devices 120. One way to keep track outbound calls from the communication device 120 is to monitor incoming calls directed to phone numbers assigned to communication devices 125. The outbound calls can be voice-based calls, text messages, etc.

By way of a non-limiting example, for one or more of the phone numbers assigned to communication devices 120, the call management system 170 can be configured to produce a log or call information 110 to include: a time when an attempted call from a particular phone number is made from a respective communication device 120 to a corresponding one of communication devices 125, a duration of a respective call if the call is accepted, whether a call was accepted by a target communication device 125, how often a communication device 120 initiates an outbound call to one or more of communication devices 125, etc.

Analyzer resource 140 receives call information 110 about the phone calls made from multiple phone numbers assigned to communication devices 120 to target phone numbers assigned to communication devices 125. As mentioned, the call information can specify attributes such as: a phone number of a communication resource making the respective call, a target phone number to which the respective call is directed, a duration of the respective call, start and/or end time of the call, whether the call is accepted by the target phone device, etc.

The analyzer resource 140 analyzes the call information 110 to detect suspected undesirable or unwanted call activity (such as telemarketing activity) associated with communication devices 125 that are assigned the multiple phone numbers. Telemarketing or unwanted call activity can include persons or machines (e.g., robo-calling) that call phone numbers in order to sell or provide information about goods or services, perform solicitations, disseminate political information, solicit donations, perform surveys, etc. Unwanted call or undesirable call activity such as telemarketing may be done from a company office, from a call centre, from a home, etc. Telemarketing may involve either a live operator or a recorded message, in which case it is known as "automated telemarketing" using voice broadcasting. As mentioned, telemarketing also can include SMS (Short Message Service) type text messages.

Based on analyzing the call information 110, the analyzer resource 140 produces a list of phone numbers from which at least one telemarketer originates calls to the subscribers in the phone network 190.

By further way of a non-limiting example, the analyzer resource 140 can be configured to generate the list 160 based on heuristics. For example, the analyzer resource 140 can be configured to learn patterns of phone activity (e.g., when calls are made, durations of calls, frequency of calls, etc.) indicating that a phone line is used for telemarketing purposes. When the analyzer resource 140 detects that calls from a respective communication device fall within a pattern indicating that the calls are from a telemarketer, the analyzer resource 140 include the respective telemarketer phone number in the list 160.

One way to determine whether to place a phone number of a potential telemarketer in the list 160 can include producing a respective persistence metric for a corresponding phone number used in the phone network 190. A present value assigned to the persistence metric can vary based on a degree to which the corresponding phone number is persistently used to contact one or more subscribers in the phone network 190. The persistence metric can be increased (ore decreased as the case may be) over time to indicate that it is more and more likely that telemarketing phone calls originate from a particular phone number.

More specifically, by way of a non-limiting example, the analyzer resource 140 can detect occurrence of outbound phone calls from the phone number 610-826-4170 to one or more communication devices 125. Initially, the analyzer resource 140 can be configured to assign a low value to a persistence metric associated with the phone number 610-282-4170. The low value can indicate that the phone number 610-282-4170 is not yet detected as a telemarketing phone number.

In response to analyzing the call information 110 and detecting a high volume of relatively short calls from the phone number 610-282-4170 in a short amount of time (e.g., 100 calls within an hour of time), the analyzer resource can increase a value of the persistence metric associated with the phone number 610-282-4170.

Figure 2:
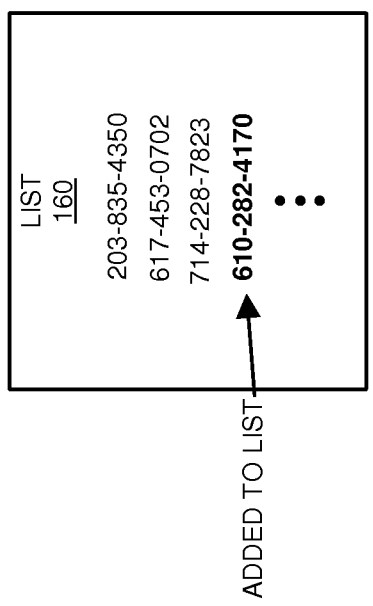
FIG. 2 is an example diagram illustrating a filter list of phone numbers according to embodiments herein.

In one embodiment, if the value assigned to the persistence metric increases above a threshold value (e.g., more than 80 short duration phone calls are made within an hour of time), the analyzer resource 140 classifies the corresponding phone number 610-282-4170 as being used for telemarketing activity. In such an instance, the analyzer resource 140 includes the phone number 610-282-4170 in the list 160 as shown in FIG. 2. Thus, if the analyzer resource 140 detects a high degree of persistence of making outbound phone calls from a particular phone number to one or more target communication devices 125, the analyzer resource 140 includes the phone number in the list 160.

As an alternative to receiving the call information 110 from call monitoring hardware and software, the call management system 170 can produce the call information based on feedback from one or more users in the network environment 100 that use the communication devices for audible communications. In such an embodiment, generation of the telemarketer call filter list 160 can be reputation-based. In other words, the communications from a particular phone number can be rated based on what one or more users in the network environment 100 think of the caller associated with a given phone number. As an example, the particular phone number can be classified as being used by a telemarketing resource if a sufficient number of persons provide such feedback.

The call management system 170 can receive feedback from phone users in a number of different ways. For example, in one embodiment, the call management system 170 can receive the feedback as subscriber input to a web page accessible to the subscribers via use of a designated URL (Uniform Resource Locator).

Via the web page or other suitable type of collection resource, the information inputted to the web page can specify the phone number used by a corresponding telemarketer to contact the subscriber. For example, via caller ID on a user's phone device, the user is able to identify an origin of the incoming call. The user inputs the caller ID value to the web page to indicate the corresponding phone number is sued for telemarketing purposes. The call management system 170 stores the inputted feedback as call information 110.

The analyzer resource 140 uses this call information 110 to include phone numbers on the list 160. FIG. 2 is an example diagram illustrating phone numbers that have been classified as being used by telemarketers.

By way of a non-limiting example, the analyzer resource 140 can be configured to produce a respective reputation metric for each of multiple phone numbers that are suspected of being used by telemarketers. The reputation metric can be configured to keep track of a degree to which a phone number is likely used for telemarketing purposes. For example, a reputation metric for a phone number initially can be set to a low value such as zero, indicating that no subscribers have indicated that the phone number is used for telemarketing. The magnitude of the reputation metric for the phone number can be incremented by one each time feedback from a different subscriber in the phone network indicates that that particular phone number is used for telemarketing activity.

Feedback from a single phone user may not provide sufficient evidence that a particular phone number is being used for telemarketing purposes. However, as discussed below, if enough subscribers indicate that the party is a telemarketer and the reputation metric for a respective phone number becomes greater than a threshold value, then the particular phone number can be included in list 160. In other words, in response to detecting that a reputation metric for a phone number substantially indicates that the phone number is used for telemarketing (e.g., because the reputation metric exceeds a threshold value), the analyzer resource 140 includes the respective phone number in the list 160.

The reputation-based feedback can be received in a number of different manners in addition to or as an alternative to the manner as discussed above. For example, in one embodiment, the call management system 170 can be configured to receive feedback from a subscriber based on a sequence of buttons being pressed on a phone device to which a given telemarketing call is made telemarketer to the subscriber. In other words, a subscriber can receive an incoming call and learn that the call is from a telemarketer. In such an instance, subsequent to receiving the incoming call, the user can press a sequence of buttons such as *666 to provide notification to a phone respective service provider that the last received call was from a telemarketer resource. The call management system 170 keeps track of how many times different callers press the *666 sequence after receiving a call from the particular phone number. In response to receiving the feedback, and detecting that multiple users above a threshold value press the *666 sequence, the analyzer resource 140 includes the corresponding phone number of the telemarketer on the list 160.

In accordance with further embodiments, a business entity such as a service provider can earmark a set of phone numbers to monitor telemarketer activity in the phone network 190. The service provider can publicly distribute the set of phone numbers through one or more information distribution channels (e.g., via the Internet, phone book, white pages web service, etc.). The set of phone numbers can appear as though they are assigned to different subscribers in a phone network, although they are not. Telemarketers may monitor the distribution channels for numbers to call. The service provider can monitoring incoming calls to the earmarked set of phone numbers because the calls are directed their own call monitoring equipment. In response to detecting calls to the earmarked set of phone numbers from telemarketers, the business entity can initiate inclusion of respective phone numbers of the one or more telemarketers in the call filter list 160.

As discussed above, the analyzer resource 140 can implement one or a combination of techniques to receive subscriber feedback and detect whether a particular phone number is potentially being used by a telemarketer resource to perform telemarketing activity in the phone network 190 in any of multiple different ways. In accordance with further embodiments, in addition to or as an alternative to the above embodiments, note that the analyzer resource 140 (or other suitable resource) in the network environment 100 optionally can be configured to verify a candidate phone number suspected of being used for telemarketing activity prior to placing the suspected phone number on the list 160.

One way to verify that the phone number is used for telemarketing purposes is to initiate a call to the suspected phone number and make an inquiry as to the availability of services, goods, information, etc.

Another way to verify that a telemarketer in the phone network is using the particular phone number for telemarketing is to perform a search for information about the particular phone number on the Internet. Certain web sites can be configured to support logging of phone numbers used for telemarketing purposes.

In one embodiment, subsequent to verification that the particular phone number is used for telemarketing activity, the analyzer resource 140 adds the particular phone number to the list 160.

In further example embodiments, owners of the phone number may be notified or become aware that they are included on the list. Embodiments herein can include implementing a process in which parties that have been included on the list can initiate removal of their number from the list if the phone number is not used for telemarketing purposes.

As previously discussed, producing the list 160 of phone numbers is useful because it enables filtering of telemarketer phone calls. For example, the call management system 170 can be configured to monitor calls from the numbers in the list and block respective calls from the numbers in the list 160 to corresponding target phone devices.

A service provider (such as a service provider that provides phone services in a cable network environment) can receive call handling instructions from each of one or more subscribers in the phone network that subscribe to telemarketer call filtering. The call handling instructions indicate how to handle subsequently received incoming phone calls from phone numbers in the list.

FIG. 3 is an example diagram illustrating names of subscribers and corresponding call handler settings according to embodiments herein.

As shown and as indicated by respective checkmarks, both John Doe and David Johnston subscribe to the call filter function in which the call management system 170 performs custom call treatment for incoming calls directed. The call handler settings 150 can be received in any suitable manner such as via a web page accessible to the subscribers.

In this example embodiment, John Doe subscribes to call filtering and is assigned target phone number 617-453-0702. Assume in this example that the service provider operating call management system 170 receives an incoming phone call (from a phone number in the list 160) directed to phone number 617-453-0702. In response to identifying that the incoming phone call originates from a phone number (such as 610-282-4170) which happens to be present in the list 160, the service provider handles the incoming phone call in accordance with the call handling instructions provided by John Doe. In this example, the call management system 170 allows the call alert to notify the communication device 125-1 operated by John Doe. However, the call management system 170 provides a text notification (such as in place of or in addition to standard caller ID information) such that the user John Doe is notified that the caller's number is on the list 160 of telemarketers or other undesirable callers.

In further embodiments, the call management system 170 can be configured to forward the call alert associated with an incoming call to the target phone device to audibly notify a user of the target device of the incoming call. For example, forwarding of the call alert causes the subscriber's phone device to audibly ring to notify the user of the incoming call. As mentioned, the call management system 170 can also provide notification (e.g., text, audible tone, etc.) to the target phone device that the incoming call is from a phone number on the list 160. In one embodiment, based on the notification that a phone number is in the list 160, the target phone device can be configured to play a unique audible tone during the ringing such that the user of the target phone device is audibly notified that the incoming, yet-to-be answered call is from a telemarketer included on the list 160. Accordingly, the user can choose not to answer the incoming call because it is known to the user that it is likely form a telemarketer.

In another example embodiment, David Johnston subscribes to call filtering and is assigned target phone number 607-754-1648. Assume in this example that the service provider operating call management system 170 receives an incoming phone call (from a phone number in the list 160) directed to phone number 607-754-1648. In response to identifying that the incoming phone call originates from a phone number (such as 610-282-4170) present in the list 160, the service provider handles the incoming phone call in accordance with the call handling instructions provided by David Johnston. In this example, the call management system 170 blocks the call alert to prevent David Johnston from being interrupted by telemarketer activity. In one embodiment, the call management system 170 blocks an incoming call and does not provide notification.

In accordance with further embodiments, the subscriber can indicate to allow incoming calls from phone numbers on the list but request receipt of a notification such as a text message or a unique audio tone along with notification of the incoming call from the service provider so that the subscriber is able to discern whether an incoming call is from a telemarketer or not. If desired, because the user is notified of the incoming call or call alert, the user can answer the incoming call even though it is from a phone number on the list.

Other call handling options can include forwarding the incoming call (which happens to be on list 160) directly to a user's voicemail box, blocking the call alert to the called party and/or playing a pre-recorded announcement back to the calling party on the list 160, etc.

In accordance with further embodiments, note that the analyzer resource 140 can be configured to classify each respective phone number in the list 160 depending on a threat level associated with a telemarketer that uses the respective phone number in the list to call one or more target phone devices. For example, assume that the analyzer resource receives input indicating that a phone number is suspected of being used for fraudulent purposes such as identity theft. In such an instance, the analyzer resource 140 can classify the phone number in the list 160 as a high level of threat. The call management system 170 can be configured to unconditionally block this phone number as being assigned the high level of threat.

In other instances, a phone number may be associated with a political campaign. In such an instance, the phone number associated with the political campaign can be assigned a low threat level.

Upon receiving an incoming call from the respective telemarketer in the list 160 to a target phone device in the phone network 190, embodiments herein can include providing notification to the target phone device of the threat level associated with the respective telemarketer making the call. The notification can be a text message, audible tone, audible message, etc.

As mentioned above, the call management system 170 can be configured to selectively block incoming call calls to target phone devices depending on the level of threat assigned to the telemarketer phone number. For example, the call management system 170 can be configured to block all calls from phone numbers that are classified as a high level of threat; the call management system 170 can be configured to provide notification of incoming calls to corresponding subscribers the phone number from which the call is made is classified as a low level of threat. In a manner as previously discussed, the subscriber can specify how to be notified of the different threat levels.

Figure 4:
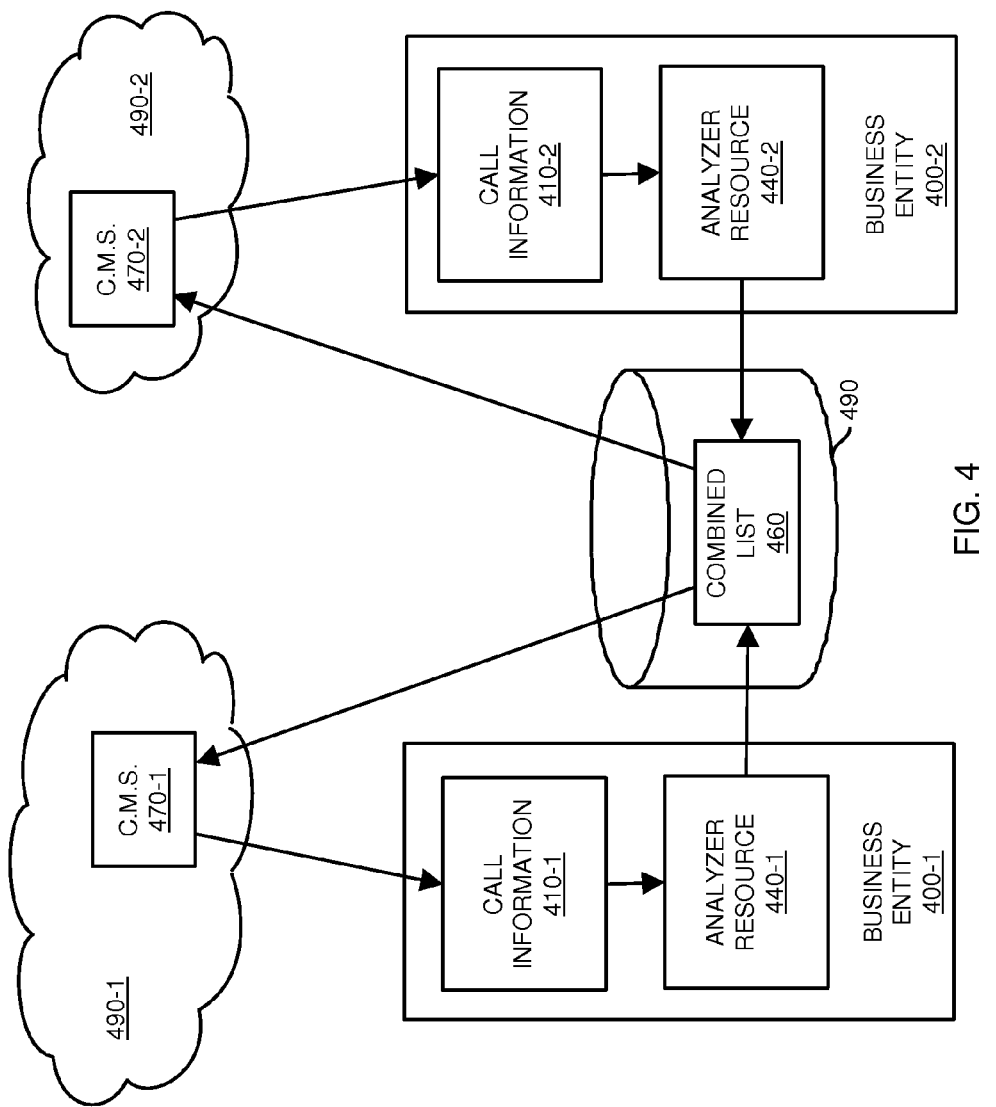
FIG. 4 is an example diagram illustrating generation of a filter list via input from multiple call management systems according to embodiments herein.

FIG. 4 is an example diagram illustrating generation of a combined filter list via input from multiple call management systems according to embodiments herein.

As shown, further embodiments herein can include creating a combined call filter list 460 and storing such a list in a federated database. For example, in any of the manners as previously discussed, a first business entity 400-1 (i.e., first service provider) can operate call management system 470-1 to receive and/or produce call information 410-1. Analyzer resource 440-1 receives call information 410-1 to produce a first set of phone numbers of suspected telemarketing activity in phone network 490-1.

Additionally, in any of the manners as previously discussed, a second business entity 400-2 (e.g., a second service provider) can operate call management system 470-2 to produce call information 410-2. Analyzer resource 440-2 receives call information 410-2 to produce a second list of phone numbers of suspected telemarketing activity in phone network 490-2.

Embodiments herein can include producing a combined list 460 including at least the first set and the second set of phone numbers and storing the combined list 460 of phone numbers in a federated database (i.e., repository). Via shared access to the federated database (i.e., repository 490), both the first business entity 400-1 (such as call management system 470-1) and the second business entity 400-2 (such as call management system 470-2) can filter one or more incoming calls to subscribers in a manner as previously discussed depending on whether an incoming call originates from a number in the list 460.

Figure 5:
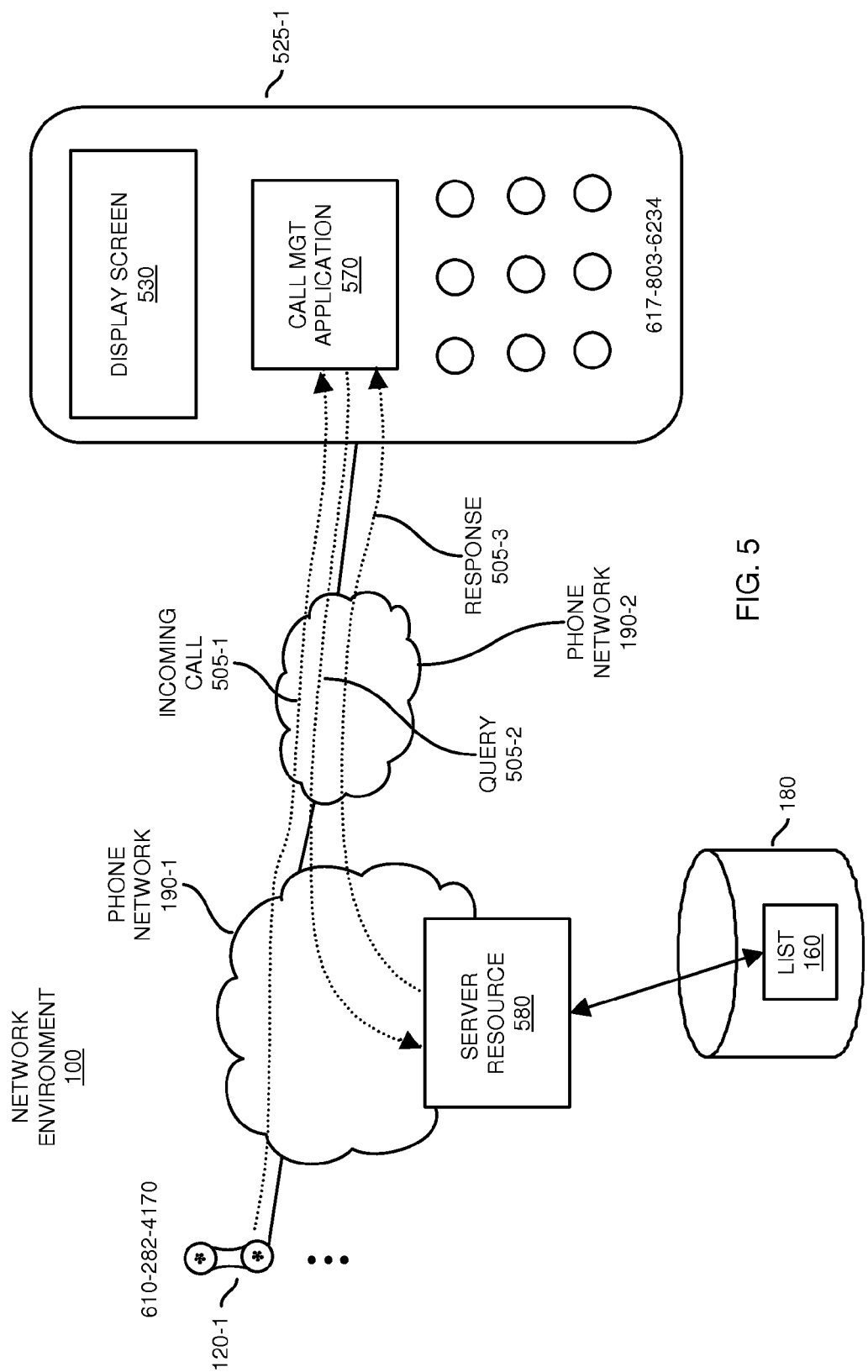
FIG. 5 is an example diagram illustrating use of a filter list according to embodiments herein.

FIG. 5 is an example diagram illustrating another use of a filter list according to embodiments herein.

In this example embodiment, assume that the communication device 525-1 (such as a cellular phone device, smart phone, etc.) is assigned the phone number 617-803-6234. The communication device 525-1 executes call management application 570 to handle incoming calls to the communication device 525-1. In one embodiment, phone number 190-2 is any suitable type of network such as a cellular phone network. Phone network 190-1 is any suitable type of phone network.

Communication device 525-1 receives notification of an incoming call 505-1 from communication device 120-1. The call management application 570 may or may not cause the corresponding communication device 525-1 to audibly notify the user of communication device 525-1 of the incoming call 505-1. Assume that the incoming call 505-1 is generated from phone number 610-282-4170, which happens to be on the list 160.

By way of a non-limiting example, the call management application 570 can be configured to screen incoming calls to communication device 525-1 to determine appropriate handling for the incoming call. For example, in response to receiving the incoming call 505-1 to communication device 525-1, the call management application retrieves the call origination information from the received caller ID information associated with the incoming call 505-1.

The call management application 570 of the communication device 525-1 performs a query to determine whether the phone number (e.g., 610-282-4170) is included on the list 160 of phone numbers suspected of being used by telemarketers. The call management application 570 can include the phone number 610-282-4170 in the query 505-2.

In one embodiment, to transmit the query 505-2 to server resource 580, the call management application 570 establishes a suitable communication link (e.g., WiFi™ link, cellular phone link, etc.) with server resource 580. The call management application 570 then transmits the query 505-2 in accordance with any suitable protocol over the established communication link.

Server resource 580 receives the query 505-2 and makes a determination whether the phone number 610-282-4170 included in the query 505-2 is present in the list 160. In this instance, because the phone number 610-282-4170 is in the list 160 (see FIG. 2), the server resource 580 produces the response 505-3 to indicate that the phone number of the incoming call 505-1 is in the list 160.

The call management application 570 receives the response 505-3 to the query 505-2. As mentioned, the response indicates that the phone number 610-282-4170 is suspected of being used for telemarketing activity because it is in the list 160.

Call management application 570 then handles the incoming call 505-1 in accordance with call handler settings provided by the user of the communication device 525-1. For example, depending on call handler settings, and because the phone number is in the list 160, the call management application 570 can terminate the incoming call 505-1. In accordance with further embodiments, the call management application 570 can be configured to display a text message on display screen 530 indicating that the incoming call 505-1 is on the list 160 and/or is received from a telemarketer. The call management application 570 can cause the communication device 525-1 to produce a unique audible sound indicating to a respective user of the communication device 525-1 that the phone number of the calling party (likely a telemarketer) is on the list 160, and so on.

In one embodiment, the look-up process of determining whether a number is on the list 160 is fee-based. In such an embodiment, the user of the communication device 525-1 and call management application 570 can be charged a fee for each time the call management application 570 performs a query to determine if a phone number of the incoming call is on the list 160. Further embodiments can include charging a flat rate fee to perform queries.

In a manner as discussed above, the call management application 570 can check whether each received incoming call is on the list 160. Responsive to detecting that a phone number from which a subsequent incoming call received by the communication device 525-1 is not classified as being used for telemarketing (e.g., not on the list 160), the call management application 570 can provide notification (e.g., standard ringing of the phone an display of received caller ID information) to a user of the communication device 525-1 (such as a mobile phone device) that the incoming call is not from a phone number on the list 160.

In accordance with further embodiments, assuming that an incoming call is not on the list, the call management application 570 can be configured to receive feedback from the user operating communication device 525-1 whether a received incoming call was from a telemarketer. In other words, a user of the communication device 525-1 can receive a call form a telemarketer because the telemarketer's phone number is initially not on the list 160. The user can mark the incoming call as being received from a telemarketer based on input from the user to the communication device 525-1. The call management application 570 logs the incoming call and related call information and potentially forwards the information to one or more resources in phone number 190.

The analyzer resource 140 or other suitable resource can be configured to communicate with call management application 570 on the communication device 525-1 to receive the feedback (e.g., marking of the incoming call and respective phone number as a telemarketer). Based on the feedback, the analyzer resource 140 can include the phone number of the marked incoming call in the list 160. In this manner, any of one or more communication devices executing call management application 570 can be configured to participate in generation of a list of phone numbers associated with telemarketers.

In accordance with yet further embodiments, note that the communication device 525-1 can be configured to locally store a listing of telemarketer phone numbers in a physical repository of the communication device 525-1. For example, the call management application 570 or other suitable resource can be configured to initiate retrieval of all or a portion of the list 160 of phone numbers for storage in a repository disposed in communication device 525-1. In such an instance, the call management application 570 would access the locally stored copy of the list 160 in the local repository to determine whether a respective incoming call is received from a telemarketer. Via at least occasional communications between the communication device 525-1 and the server resource 580, the list in the communication device 525-1 can be kept up to date.

Thus, in one embodiment, prior to receiving a notification of an incoming call alert: the communication device 525-1 initiates retrieval of the list of phone numbers from server resource 580 over networks 190. The communication device 525-1 stores the list in a repository disposed in the communication device 525-1.

Assume that the communication device 525-1 then receives an incoming call alert. In such an instance, the communication device 525-1 accesses the locally stored list to determine whether the phone number associated with the incoming call alert is included in the list. Responsive to detecting that the phone number of the incoming call alert is included in the list stored in the communication device 525-1, a local process in the communication device 525-1 determines that the incoming call alert is from an entity such as a telemarketer.

In accordance with yet further embodiments, note that the phone number of an incoming call alert may not be included in the list. In such an instance, if the user of communication device 525-1 determines that the call is from an undesirable entity such as a telemarketer, then the user of the communication device 525-1 can initiate adding the new number to the locally stored list and/or remotely stored list 160 via communications with server resource 580.

Figure 6:
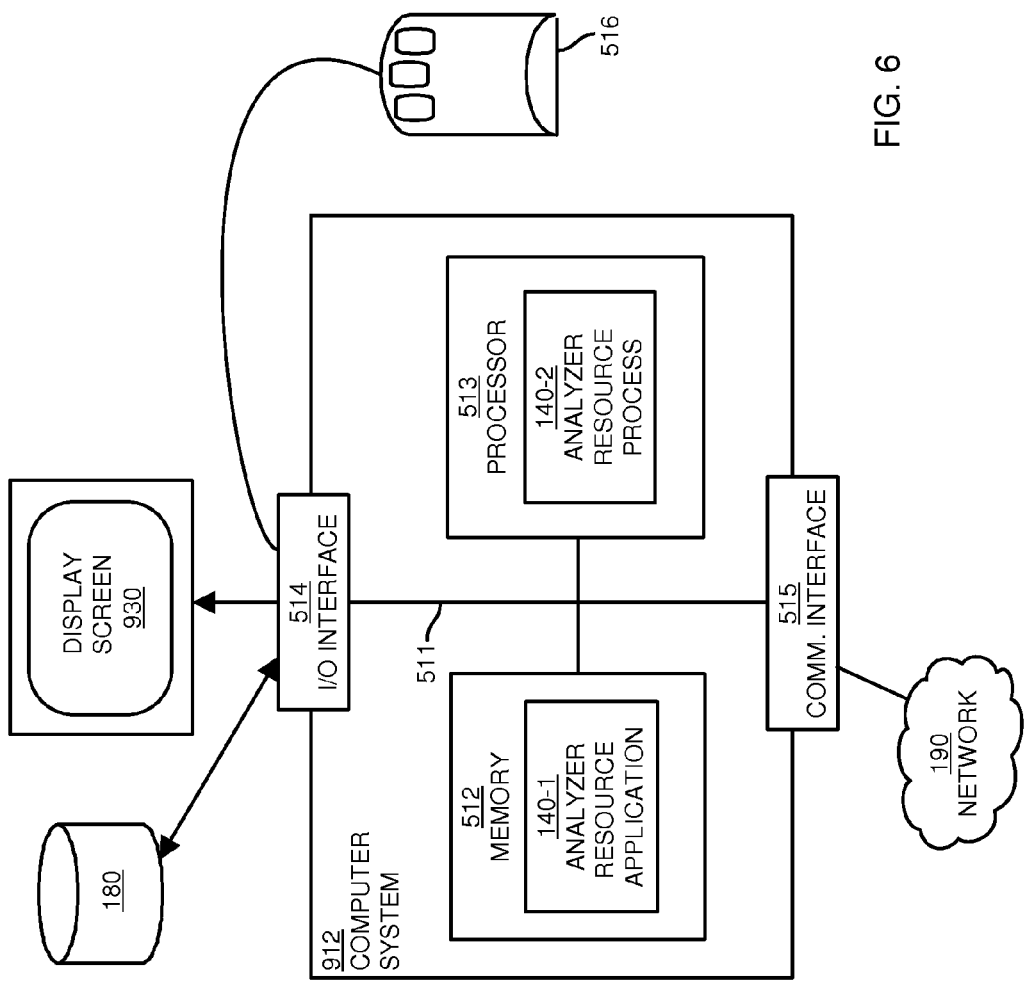
FIG. 6 is an example diagram illustrating a computer architecture in which to execute one or more embodiments as discussed herein.

FIG. 6 is an example diagram illustrating a computer architecture in which to execute one or more embodiments as discussed herein.

Any of the different processing techniques can be implemented via execution of software code on a computer system.

For example, as shown, computer system 912 of the present example can include an interconnect 511 that couples computer readable storage media 512 such as a non-transitory type of media (i.e., any type of hardware storage medium) in which digital information can be stored and retrieved. The computer system 912 can further include one or more processor devices 513, I/O interface 514, communications interface 515, etc.

I/O interface 514 provides connectivity to external resources such as a repository and, if present, other devices such as a keypad, a computer mouse, etc.

Computer readable storage medium 512 can be any hardware storage device such as memory, optical storage, hard drive, floppy disk, etc. In one embodiment, the computer readable storage medium 512 stores instructions and/or data.

Communications interface 515 enables the computer system 912 and one or more processor devices 513 to communicate over a resource such as network 190 to receive call information 110 from remote sources and communicate with other computers. I/O interface 514 enables processor devices 513 to store the respective list 160 in repository 180.

As shown, computer readable storage media 512 is encoded with analyzer resource application 140-1 (e.g., software, firmware, etc.) executed by processor 513. Analyzer resource application 140-1 can be configured to include instructions to implement any of the operations as discussed herein.

During operation of one embodiment, processor 513 accesses computer readable storage media 512 via the use of interconnect 511 in order to launch, run, execute, interpret or otherwise perform the instructions in analyzer resource application 140-1 stored on computer readable storage medium 512.

Execution of the analyzer resource application 140-1 produces processing functionality such as analyzer resource process 140-2 in processor 513. In other words, the analyzer resource process 140-2 associated with processor 513 represents one or more aspects of executing analyzer resource application 140-1 within or upon the processor 513 in the computer system 912.

Those skilled in the art will understand that the computer system 912 can include other processes and/or software and hardware components, such as an operating system that controls allocation and use of hardware resources to execute analyzer resource application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 912 may reside at any location (e.g., to execute the analyzer resource 140, call management application 570, etc.) or can be included in any suitable resource in network environment 100 to implement functionality as discussed herein.

Functionality supported by the different resources will now be discussed via flowcharts in FIGS. 7-9. Note that the steps in the flowcharts below can be executed in any suitable order.

Figure 7:
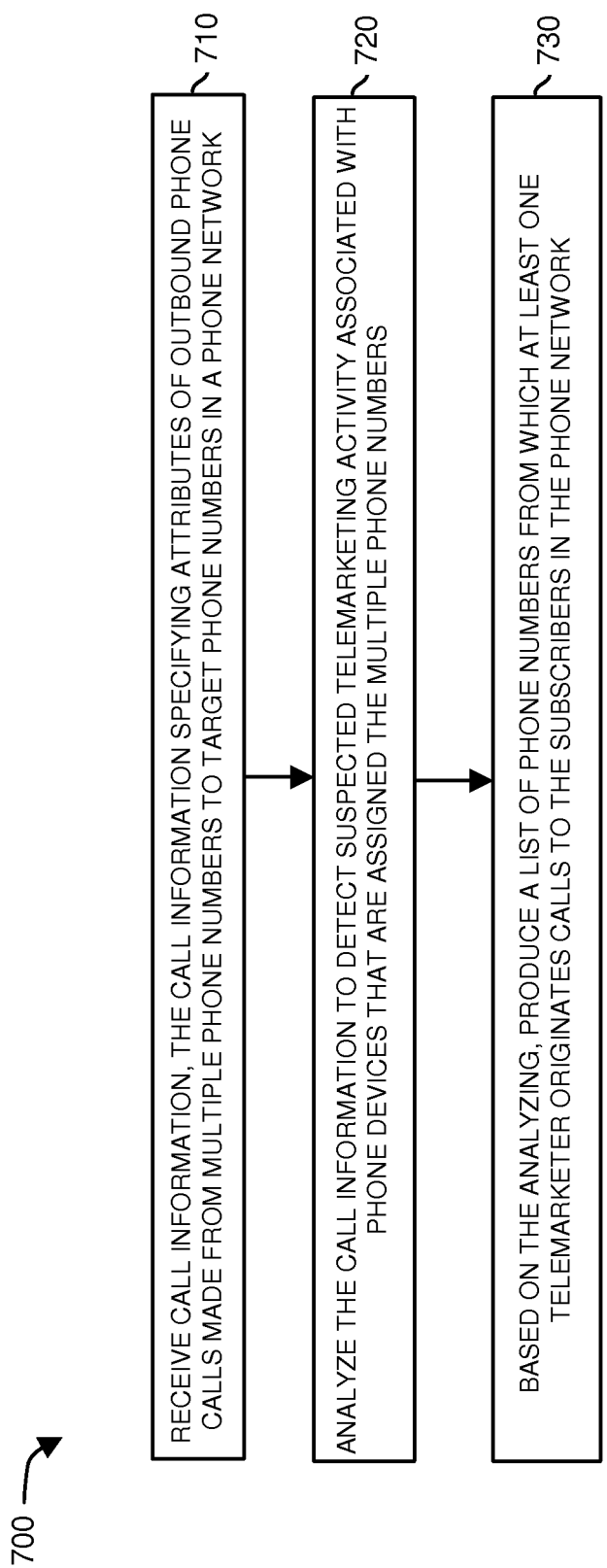
FIGS. 7, 8, and 9 are example diagrams illustrating methods according to embodiments herein.

FIG. 7 is a flowchart 700 illustrating an example method of producing a call filter list according to embodiments. Note that there will be some overlap with respect to concepts as discussed above.

In processing block 710, the analyzer resource 140 receives call information 110 specifying attributes of outbound phone calls made from multiple phone numbers to one or more target phone numbers 125 in a phone network 190.

In processing block 720, the analyzer resource 140 analyzes the call information 110 to detect suspected un wanted call activity (such as telemarketing activity) associated with phone devices 120 that are assigned the multiple phone numbers.

In processing block 730, based on the analysis, the analyzer resource 140 produces a list 160 of phone numbers from which at least one entity originates unwanted calls to the subscribers in the phone network 190.

Figure 8:
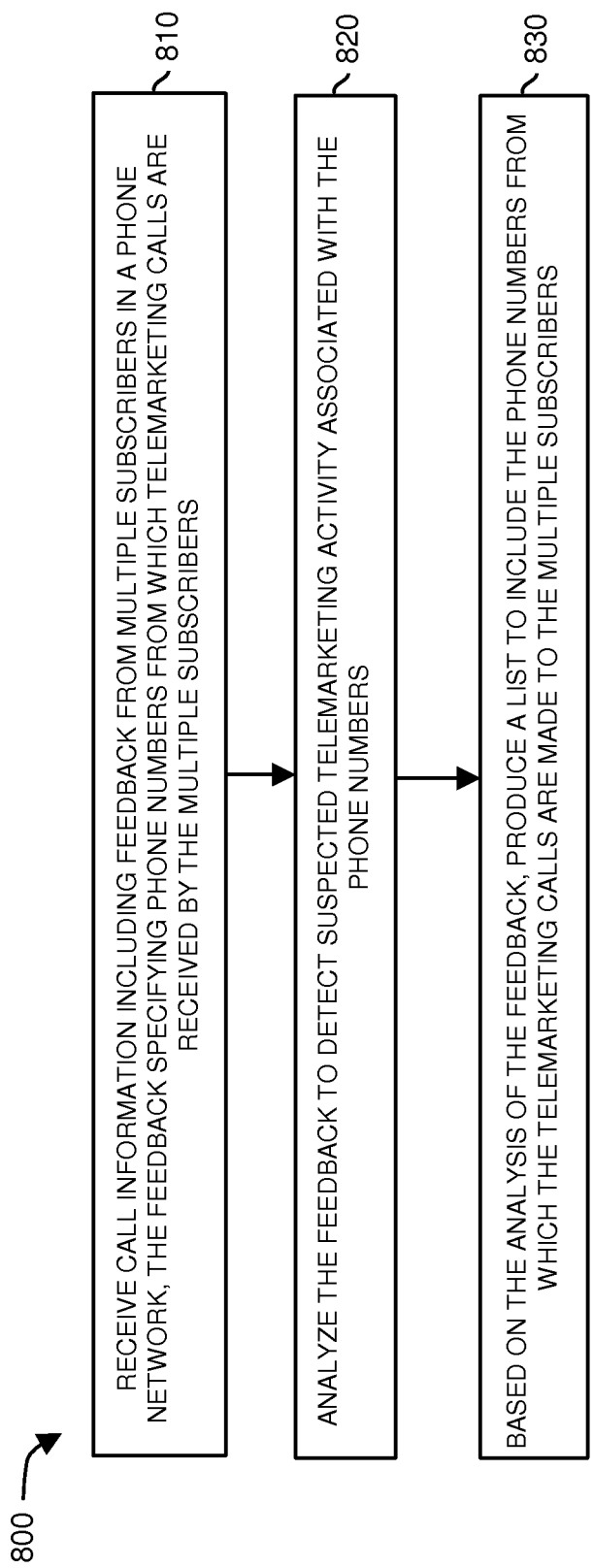

FIG. 8 is a flowchart 800 illustrating an example method of producing a call filter list according to embodiments. Note that there will be some overlap with respect to concepts as discussed above.

In processing block 810, the analyzer resource 140 receives call information 110 including feedback from multiple subscribers in a phone network 190. In one embodiment, the feedback from the one or more subscribers specifies phone numbers from which the multiple subscribers receive undesirable calls.

In processing block 820, the analyzer resource 140 analyzes the feedback to detect suspected undesirable call activity associated with the phone numbers.

In processing block 830, based on the analysis of the feedback, the analyzer resource 140 produces a list 160 to include the phone numbers from which the undesirable calls are made to the multiple subscribers. Accordingly, depending on rules for including the phone number in the list 160, feedback from one or more subscribers can result in inclusion of a subscriber-provided phone number in the list 160.

Figure 9:
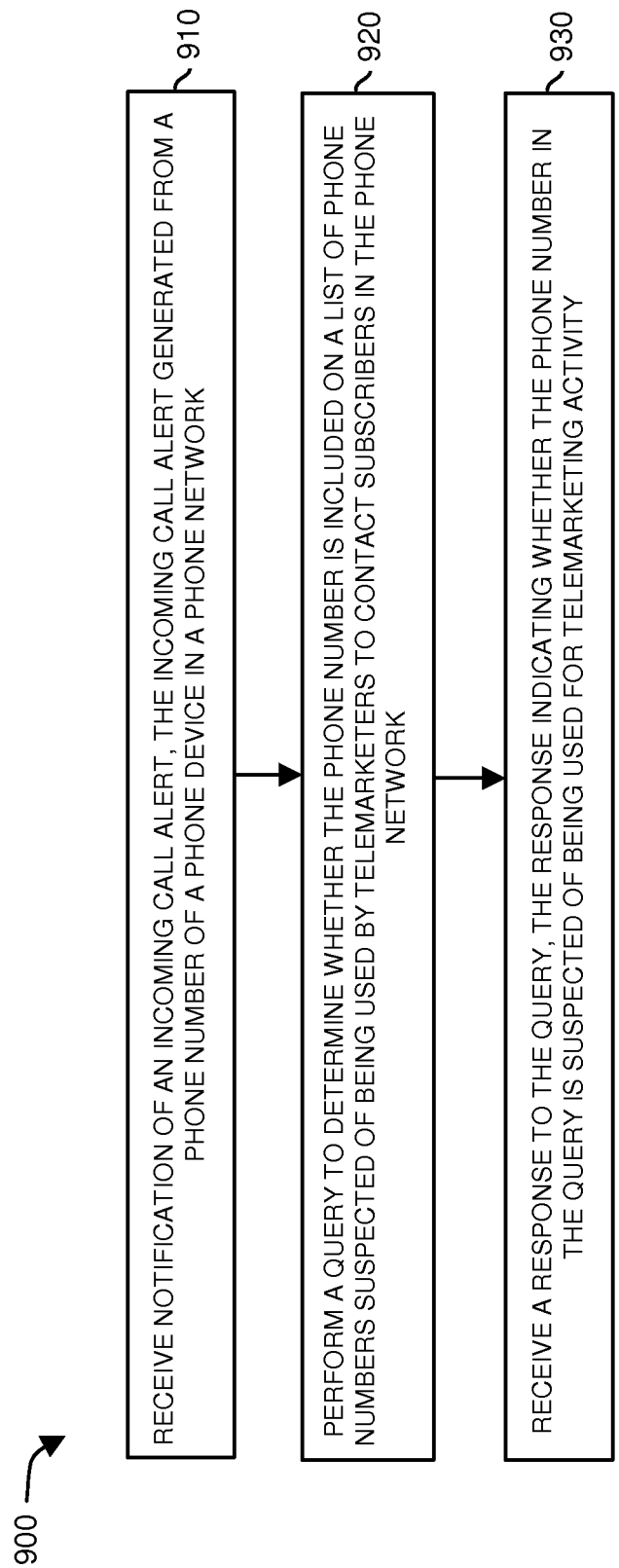

FIG. 9 is a flowchart 900 illustrating an example method according to embodiments. Note that there will be some overlap with respect to concepts as discussed above.

In processing block 910, the call management application 570 receives notification of an incoming call 505-1 alert; the incoming call 505-1 alert is generated from a phone number of a phone device in a phone network 190-1.

In processing block 920, the call management application 570 performs a query to determine whether the phone number is included in a list 160 of phone numbers suspected of being used by entities such as telemarketers to contact subscribers in the phone network 190-1.

In processing block 930, the call management application 570 receives a response to the query 505-2; the response indicates whether the phone number in the query 505-2 is suspected of being used for unwanted activity such as telemarketing activity.

Note again that techniques herein are well suited for performing call filtering in a phone network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving call information, the call information specifying attributes of phone calls made from multiple phone numbers to target phone numbers in a phone network, the call information indicating frequencies of the phone calls made from the multiple phone numbers to the subscribers in the phone network;
    analyzing the call information to detect occurrence of unwanted call activity originating from the multiple phone numbers;
    based on the analyzing, and the frequencies of the phone calls made, producing a list of phone numbers from which at least one entity originates unwanted calls in the phone network;
    wherein analyzing the call information to detect occurrence of unwanted call activity includes producing a respective persistence metric for a corresponding phone number of the multiple phone numbers based on a degree to which the corresponding phone number is used to contact subscribers in the phone network, the respective persistence metric measuring an amount of phone calls per unit of time from the corresponding phone number to the subscribers in the phone network; and
    wherein producing the list includes classifying the respective phone number as being used for unwanted call activity in the phone network in response to detecting that a magnitude of the respective persistence metric for the corresponding phone number is above a threshold persistence value.

2. The method as in claim 1 further comprising:
    receiving call handling instructions from a given subscriber in the phone network, the call handling instructions indicating how to handle subsequently received incoming phone calls from phone numbers in the list;

receiving an incoming phone call directed to a phone number assigned to a phone device operated by the given subscriber; and in response to identifying that the incoming phone call originates from a phone number present in the list, handling the incoming phone call in accordance with the call handling instructions received from the given subscriber.

3. The method as in claim 2, wherein handling the incoming call includes terminating the incoming call in accordance with the call handling instructions.

4. The method as in claim 1 further comprising:
implementing a call filter service of preventing incoming phone call alerts that originate from phone numbers in the list from being forwarded to subscribers in the phone network that subscribe to the call filter service.

5. The method as in claim 1 further comprising:
implementing a call handling service of providing a unique audible notification along with an incoming phone call alert that originates from a phone number in the list, the unique audible notification indicating that the incoming phone call alert is likely from a telemarketer.

6. The method as in claim 1 further comprising:
receiving notification of an incoming call to a target phone device in the phone network, the incoming call generated from a phone number of a calling phone device in the phone network;
determining that the phone number of the calling phone device is included in the list;
producing a notification that the phone number is included in the list; and
transmitting the notification to the target phone device that the incoming call to the target phone device is suspected of being received from a telemarketer.

7. The method as in claim 6 further comprising:
forwarding a call alert associated with the incoming call to the target device to audibly notify a user of the target device of the incoming call, the target phone device playing back a unique audible signal to indicate that the incoming phone call is from a phone number on the list.

8. The method as in claim 1, wherein analyzing the call information further comprises: detecting that a particular phone number of the multiple phone numbers is potentially being used by a telemarketer resource to perform telemarketing activity in the phone network, and initiating a call to the particular phone number to verify that the particular phone number is used for telemarketing activity; and
wherein producing the list includes: adding the particular phone number to the list responsive to the verifying, based on the initiated call, that the particular phone number is used for telemarketing activity.

9. The method as in claim 1 further comprising:
earmarking a corporate sponsored set of phone numbers to monitor occurrence of telemarketer activity in the phone network, the set of phone numbers appearing to be assigned to different subscribers although they are not assigned to any subscribers;
publicly distributing the set of phone numbers through information distribution channels to at least one telemarketer;
monitoring calls to the earmarked set of phone numbers; and
in response to detecting calls to the earmarked set of phone numbers from the at least one telemarketer, including a phone number of the at least one telemarketer in the list.

10. The method as in claim 1 further comprising:
receiving the call information as feedback from at least one subscriber in the phone network.

11. The method as in claim 1, wherein the call information further indicates durations of the calls made from the multiple phone numbers to the subscribers in the phone network, the method further comprising:
including the multiple phone numbers in the list based at least in part on the durations of the calls made from the multiple phone numbers to the subscribers in the phone network.

12. The method as in claim 1, wherein the list is a first list produced by a first business entity, the first list indicating suspected telemarketing calls to subscribers in a first phone network, the method further comprising:
receiving a second list produced by a second business entity, the second list indicating suspected telemarketing calls to subscribers in a second phone network;
producing a combined list including at least the first list and the second list; and
storing the combined list in a federated database, the combined list accessible to both the first business entity and second business entity.

13. A method comprising:
receiving call information including feedback from multiple subscribers in a phone network, the feedback specifying phone numbers from which undesirable calls are received by the multiple subscribers;
analyzing the feedback to detect suspected undesirable call activity associated with the phone numbers;
based on the analysis of the feedback, producing a list to include the phone numbers from which the undesirable calls are made to the multiple subscribers;
classifying a respective phone number in the list depending on a threat level associated with a telemarketer that uses the respective phone number in the list to make calls to the multiple subscribers; and
upon receiving an incoming call from the respective telemarketer to a target phone device in the phone network, providing notification to the target phone device of the threat level associated with the respective telemarketer;
wherein producing the list and classifying the respective phone number in the list includes: i) producing a respective persistence metric for the respective phone number based on a degree to which the respective phone number is used to contact the subscribers in the phone network, the respective persistence metric measuring an amount of phone calls per unit of time from the corresponding phone number to the subscribers in the phone network; and ii) including the respective phone number as being used for unwanted call activity in the phone network in response to detecting that a magnitude of the respective persistence metric for the corresponding phone number is above a threshold value.

14. The method as in claim 13 further comprising:
producing a respective reputation metric for each of the phone numbers based on a degree to which a corresponding one of phone numbers is used to contact subscribers in the phone network; and
in response to detecting that a reputation metric for a respective phone number substantially indicates that the corresponding phone number is used by a telemarketer, including the respective phone number in the list.

15. The method as in claim 13 further comprising:
receiving the feedback based on a sequence of buttons being pressed on a target phone device to which a given telemarketing call is made; and
in response to receiving the feedback from the target phone device, including a phone number of a phone resource from which the given telemarketing call is made in the list.

16. The method as in claim 13 further comprising:
receiving the feedback as subscriber input to a web page, the subscriber input specifying the phone number used by a corresponding telemarketer to contact the subscriber; and
updating the list to include the phone number used by the corresponding telemarketer.

17. The method as in claim 13 further comprising:
communicating with an application on a mobile phone device to receive the feedback, the application logging an incoming call to the mobile phone device and indicating whether the user of the mobile phone device marks the incoming call as being received from a telemarketer.

18. The method as in claim 13, wherein providing the notification to the target phone device includes:
responsive to detecting that a first telemarketer placing an incoming call to the target phone device represents a high threat, providing notification to the user of the target phone device that the threat level associated with the first telemarketer is high; and
responsive to detecting that a second telemarketer placing an incoming call to the target phone device represents a low threat, providing notification to the user of the target phone device that the threat level associated with the second telemarketer is low.

19. A method comprising:
receiving notification of an incoming call alert, the incoming call alert generated from a phone number of a phone device in a phone network;
performing a query to determine whether the phone number is included on a list of phone numbers suspected of being used by telemarketers to contact subscribers in the phone network, the phone number included in the list in response to detecting that a magnitude of a persistence metric associated with the phone number is greater than a threshold value, the persistence metric measuring an amount of phone calls per unit of time from the phone number to the subscribers in the phone network, the persistence metric indicating that the phone number is used for unwanted call activity in the phone network;
receiving a response to the query, the response indicating whether the phone number in the query is suspected of being used for telemarketing activity; and
in addition to forwarding the incoming call alert to a target phone device to which a corresponding incoming call is directed, initiating playback of a unique audible tone at the target phone device to indicate that the incoming call alert originates from a phone number in the list.

20. The method as in claim 19 further comprising:
receiving the notification from an application executing on a mobile phone device;
via the application, producing a query to include the phone number;
forwarding the query from the application over a network connection to a server resource that is remotely located with respect to the mobile phone device; and
at the application in the mobile phone device, receiving the response from the server resource over the network connection.

21. The method as in claim 19 further comprising:
responsive to detecting that a second phone number is not classified as being used for telemarketing, providing notification to a user of the mobile phone device that an incoming call alert associated with the second phone number is not included on the list.

22. The method as in claim 19 further comprising:
prior to receiving the notification of the incoming call alert:
i) initiating retrieval of the list of phone numbers from a remote resource over a network connection; and ii) storing the list in a repository disposed in a communication device that subsequently receives the incoming call alert; and
wherein performing the query includes accessing the list stored in the communication device to determine whether the phone number of the phone device is included in the list.

23. The method as in claim 22 further comprising:
responsive to detecting that the phone number is included in the list stored in the communication device, providing notification to a user of the communication device that the incoming call alert is from a telemarketer.

24. A computer system comprising:
at least one processor device; and
a hardware storage resource coupled to the at least one processor device, the hardware storage resource storing instructions that, when executed by the at least one processor device, cause the at least one processor device to perform operations of:
receiving call information, the call information specifying attributes of phone calls made from multiple phone numbers to target phone numbers in a phone network;
analyzing the call information to detect suspected undesirable activity associated with phone devices that are assigned the multiple phone numbers;
based on the analyzing, producing a list of phone numbers from which at least one entity originates undesirable calls to the subscribers in the phone network;
wherein producing the list includes: i) producing a persistence metric for a particular phone number based on a degree to which the particular phone number is used to contact the subscribers in the phone network, and ii) in response to detecting that the persistence metric indicates more than a threshold number of phone calls per unit of time is made from the particular phone number to the subscribers in the phone network, including the particular phone number in the list of phone numbers.

25. The computer system as in claim 24, wherein the at least one processor device further supports operations of:
receiving call handling instructions from a given subscriber in the phone network, the call handling instructions indicating how to handle subsequently received incoming phone calls from phone numbers in the list;
receiving an incoming phone call directed to a phone number assigned to a phone device operated by the given subscriber; and
in response to identifying that the incoming phone call originates from a phone number present in the list, handling the incoming phone call in accordance with the call handling instructions received from the given subscriber.

26. The computer system as in claim 25, wherein handling the incoming call includes terminating the incoming call in accordance with the call handling instructions.

27. The computer system as in claim 24, wherein the at least one processor device further supports operations of:
  implementing a call filter service of preventing incoming phone call alerts that originate from phone numbers in the list from being forwarded to subscribers in the phone network that subscribe to the call filter service.

28. The computer system as in claim 24, wherein the at least one processor device further supports operations of:
  implementing a call handling service of providing a notification along with an incoming phone call alert that originates from a phone number in the list, the notification indicating that the incoming phone call alert is from a telemarketer.

29. The computer system as in claim 24, wherein the at least one processor device further supports operations of:
  receiving notification of an incoming call to a target phone device in the network, the incoming call generated from a phone number of a calling phone device in the phone network;
  determining that the phone number of the calling phone device is included in the list;
  producing a notification that the phone number is included in the list; and
  transmitting the notification to the target phone device that the incoming call to the target phone device is suspected of being received from a telemarketer.

30. The computer system as in claim 29, wherein the at least one processor device further supports operations of:
  forwarding the call alert associated with the incoming call to the target device to audibly notify a user of the target device of the incoming call, the target phone device playing back a unique audible signal to indicate that the incoming phone call is from a phone number on the list.

31. The computer system as in claim 24, wherein analyzing the call information further comprises: detecting that the particular phone number of the multiple phone numbers is potentially being used by a telemarketer resource to perform telemarketing activity in the phone network, and initiating a call to the particular phone number to verify that the particular phone number is used for telemarketing activity; and
  wherein producing the list includes: adding the particular phone number to the list responsive to detecting that the particular phone number is used for telemarketing activity.

32. The computer system as in claim 24, wherein the at least one processor device further supports operations of:
  receiving the call information as feedback from the subscribers in the phone network.

33. The computer system as in claim 24, wherein the at least one processor device further supports operations of:
  increasing a magnitude of the value assigned to the persistence metric in response to detecting occurrence of additional calls made from the particular phone number to the subscribers in the phone network.

34. The computer system as in claim 26, wherein the at least one processor device further supports operations of:
  in response to detecting that a particular phone number of the multiple phone numbers is potentially being used by a telemarketer resource to perform telemarketing activity in the phone network, initiating a call to the particular phone number to verify that the particular phone number is used for telemarketing activity; and
  adding the particular phone number to the list responsive to detecting that the particular phone number is used for telemarketing activity.

35. The computer system as in claim 24, wherein the at least one processor device further supports operations of:
  earmarking a corporate sponsored set of phone numbers to monitor occurrence of telemarketer activity in the phone network, the set of phone numbers appearing to be assigned to different subscribers although the phone numbers in the set are not assigned to any subscribers;
  publicly distributing the set of phone numbers through information distribution channels to at least one telemarketer;
  monitoring calls to the corporate sponsored set of phone numbers; and
  in response to detecting calls to the corporate sponsored set of phone numbers from the at least one telemarketer, including a phone number of the at least one telemarketer in the list.

36. Computer-readable storage hardware having instructions stored thereon, the instructions, when carried out by a processing device, causes the processing device to perform operations of:
  receiving call information, the call information specifying attributes of phone calls made from multiple phone numbers to target phone numbers in a phone network;
  analyzing the call information to detect suspected telemarketing activity associated with phone devices that are assigned the multiple phone numbers;
  based on the analyzing, producing a list of phone numbers from which at least one telemarketer originates calls to the subscribers in the phone network, the analyzing including producing a persistence metric for a particular phone number based on a degree to which the particular phone number is used to contact the subscribers in the phone network; and
  in response to detecting that the persistence metric indicating more than a threshold number of phone calls per unit of time is made from the particular phone number to subscribers in the phone network, including the particular phone number in the list.

* * * * *